United States Patent Office 2,739,967
Patented Mar. 27, 1956

2,739,967
METHOD OF FORMYLATING DIHYDROPTEROIC ACID AND AMIDES THEREOF

Martin E. Hultquist, Bound Brook, and Barbara Roth, Middlesex Borough, N. J., assignors to American Cyanamid Company, New York, N. Y., a corporation of Maine No Drawing. Application April 1, 1950, Serial No. 153,484

6 Claims. (Cl. 260—251.5)

This invention relates to new substances having physiological activity and to processes of preparing the same.

In 1948, Sauberlich and Baumann, Journal of Biological Chemistry, 176, p. 165, 1948, recognized the existence of a substance that stimulated the growth in a synthetic medium of *Leuconostoc citrovorum*. This unknown substance was found to be present in commercial liver extracts and also in liver and a wide variety of natural materials. Subsequent work has shown that the growth factor was not pteroylglutamic acid, vitamin B$_{12}$, or any of the other previously recognized vitamins that occur in liver and other natural products. It has also been subsequently found that the unknown substance can replace the folic acid requirement of microorganisms and chicks. It has further been found that the growth factor will reverse the action of pteroylglutamic acid antagonists and, surprisingly will reverse the toxic effects of aminopterin (N-[4-{[(2,4-diamino-6-pyrimido[4,5-b]pyrazyl)methyl]-amino}benzoyl]glutamic acid) in mice and bacteria, under conditions in which pteroylglutamic acid is ineffective.

The citrovorum factor exists in natural products in extremely minute quantities so that its recovery therefrom is exceedingly difficult and practically impossible from a commercial point of view. However, we have discovered that it is possible to prepare compounds having the same or related biological activity by a process which makes the production of adequate amounts of the activity a commercial possibility so that it may be used in medicine. Since the chemical structure of the *Leuconostoc citrovorum* growth factor described by Sauberlich et al. has not been elucidated as yet, it is not possible to say at this time whether any of the products produced by the process described hereinafter are the same or not, even though they have the same biological activity. Insofar as we are aware, however, the products covered by the present invention are new.

The new compounds of the present invention may be prepared by formylating certain known compounds which have been previously prepared, and some of which have been described in the literature. The starting materials that may be used in the process of the present invention to prepare the new compounds include dihydropteroic acid and the amino acid amides thereof, particularly dihydropteroylglutamic acid, dihydropteroylglutamylglutamylglutamic acid, and other amino acid amides of dihydropteroic acid such as those of aspartic acid, alanine, serine, and others. The salts of these compounds may be used in the process as well.

To obtain the dihydropteroic acid or its salts or amides that may be used as starting materials, several methods are possible. One method involves the reaction of 2,4,5-triamino-6-hydroxypyridine, an alpha-beta-dihalo-propionaldehyde or one of these compounds in the form of its acetal and an aminobenzoic acid or an amino acid amide thereof under non-oxidizing conditions. Inasmuch as the initial products of the above reaction tend to become oxidized during the course thereof, as is shown in the U. S. Patent to Waller and Mowat, 2,500,296, March 14, 1950, it is generally preferred that the products of the patent be first formed and then reduced.

A process of preparing the preferred starting material of the present invention, dihydropteroylglutamic acid, by the reduction of pteroylglutamic acid is as follows:

Two grams of pteroylglutamic acid are dissolved in 150 cc. of a 1.5 N sodium hydroxide solution. 4.0 grams of zinc dust (containing 3% copper) are added, and the mixture stirred for 30 minutes. The zinc is filtered off, the solution cooled to 10° C., and neutralized to pH 3. After cooling well, the solid is collected, washed, and dried. The crude product may be used as obtained or may be further purified if desired.

The exact structure of the new compounds produced by formylation of dihydropteroic acid or one of its amides has not been definitely determined as yet due to their complex nature. It is believed, however, that they may be represented by one of the following formulae

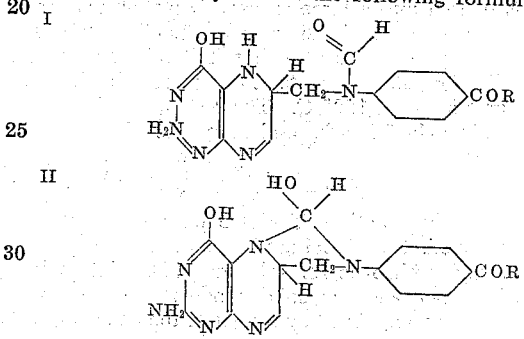

In these, R represents a hydroxyl group or a radical of an amino acid. It will be understood that both of the above may exist in tautomeric forms depending upon the conditions in which they are present.

Various formylating agents may be used to prepare the new compounds of the present invention by reaction on reduced pteroic acid or pteroic acid amides. The preferred formylating agents are the esters and amides of formic acid and orthoformic acid. Among these may be particularly mentioned methyl formate, ethyl formate, butyl formate, benzyl formate, glycol formate, methyl orthoformate, ethyl orthoformate, formamide, formamidine, and formanilide.

The reaction is caused to take place in a solvent which may include an excess of the alkyl formate or a solvent of the alcoholic type. The presence of inert solvents in the reaction mixture is permissible. The solvent is essentially anhydrous.

Basic agents such as alkali-metal alkoxides, pyridine, triethanol amine, and other tertiary amines are generally included in the reaction mixture. We prefer to use an excess of the basic agent, 2 to 3 mols of the alkali-metal alkoxides for each mol of reduced pteroylglutamic acid. Larger excesses of pyridine and tertiary amines have been used.

The temperature of the reaction will vary considerably from about 50° C. to 200° C., and the time required for the reaction to be substantially completed is from thirty minutes to six hours.

The process of the invention will now be illustrated in greater detail by means of the following examples. All parts are by weight unless otherwise indicated.

*Example 1*

Five parts of dihydropteroylglutamic acid, 1.6 parts of sodium methylate, and 25 parts of ethyl formate are heated under nitrogen for 4 hours at 150° C. in a sealed tube. The resultant tannish-gray solid is filtered off, washed with alcohol and ether, and dried. 4 millimicrograms of this product is required in 2 ml. of culture medium for ½ maximum growth of *L. citrovorum.*

Example 2

0.5 part of dihydropteroylglutamic acid, 0.16 part of dry pyridine, and 5 parts of ethyl formate are treated as in Example 1. 0.33 microgram of this product is required in 2 ml. of culture medium for ½ maximum growth of *L. citrovorum.*

Example 3

1 part of dihydrofolic acid is mixed with 5 parts of ethyl formate and 1 part of triethanol amine and heated in a sealed tube at 150° C. for 4 hours under nitrogen. The resultant solid is filtered off, washed with alcohol and ether and dried. The crude product contains approximately 0.1% by weight of the citrovorum growth factor.

Example 4

A solution of dihydrofolic acid in dilute sodium hydroxide is poured into a large excess of alcohol and the resultant precipitate of dihydrofolic acid sodium salt is filtered off. 1 part of the sodium salt is mixed with 5 parts of ethyl formate and heated in a sealed tube under nitrogen for 4 hours at 150° C. The resultant solid contains approximately 0.5% by weight of the citrovorum growth factor.

Example 5

0.5 part of dihydrofolic acid plus 5 parts ethyl formate and 5 parts ethylene glycol are heated in a sealed tube at 100° C. under nitrogen for 4 hours. The mixture is diluted with ether and the solid product isolated. It contains approximately 0.6% by weight of the citrovorum factor.

We claim:

1. A method which comprises the steps of treating dihydropteroylglutamic acid with ethyl formate in an alkaline solution at a temperature within the range of 50° C. to 200° C.

2. A method which comprises the steps of subjecting dihydropteroylglutamic acid to the action of an alkyl formate at a temperature within the range of 50° C. to 200° C.

3. The method which comprises subjecting dihydropteroylglutamic acid to the action of ethyl formate and an alkali-metal alkoxide at a temperature within the range of 50° C. to 200° C. and recovering therefrom a product having biological activity.

4. A method of preparing substances effective in sustaining the growth of *Leuconostoc citrovorum* which comprises the step of treating a compound of the group consisting of dihydropteroic acid, dihydropteroylaspartic acid, dihydropteroylglutamic acid, dihydropteroylglutamylglutamic acid, dihydropteroylglutamylglutamylglutamic acid with a lower alkyl formate and recovering said dihydroformylpterins therefrom.

5. A method of preparing growth factors which comprises the steps of subjecting dihydropteroylglutamic acid to the action of a lower alkyl formate and recovering said dihydroformylpteroylglutamic acid therefrom.

6. A method of preparing dihydroformylpteroylglutamic acid which comprises the step of reacting dihydropteroylglutamic acid with a lower alkyl formate at a temperature within the range of 50° C. to 200° C. and recovering said dihydroformylpteroylglutamic acid therefrom.

References Cited in the file of this patent

O'Dell et al.: JACS 69, 250–53 (1947).
Wolf et al.: JACS 69, 2753–59 (1947).
Gordon et al.: JACS 70, 878–79 (1948).